US009444277B2

(12) United States Patent
Luo et al.

(10) Patent No.: US 9,444,277 B2
(45) Date of Patent: Sep. 13, 2016

(54) CHARGER INTEGRATING NETWORK INTERFACE CONVERSION APPARATUS

(71) Applicant: Huawei Device Co., Ltd., Shenzhen (CN)

(72) Inventors: Bingwu Luo, Xi'an (CN); Yupeng Zhu, Beijing (CN); Yanguo He, Xi'an (CN)

(73) Assignee: HUAWEI DEVICE CO., LTD., Shenzhen (CN)

( * ) Notice: Subject to any disclaimer, the term of this patent is extended or adjusted under 35 U.S.C. 154(b) by 605 days.

(21) Appl. No.: 13/689,139

(22) Filed: Nov. 29, 2012

(65) Prior Publication Data

US 2013/0335008 A1  Dec. 19, 2013

(30) Foreign Application Priority Data

Dec. 2, 2011  (CN) .......................... 2011 1 0394924
Nov. 24, 2012  (WO) ................ PCT/CN2012/085223

(51) Int. Cl.
*H02J 7/00*  (2006.01)

(52) U.S. Cl.
CPC ............ *H02J 7/0042* (2013.01); *H02J 7/0052* (2013.01); *H02J 2007/0062* (2013.01)

(58) Field of Classification Search
CPC ....................................................... H02J 1/00
USPC ............................ 307/31; 320/113–115, 107
See application file for complete search history.

(56) References Cited

U.S. PATENT DOCUMENTS

2002/0180592 A1* 12/2002 Gromov ................. H04B 3/548
  370/200
2003/0226044 A1  12/2003 Cupps et al.
2005/0192049 A1* 9/2005 Nunez ................... G06F 1/1601
  455/556.1
2010/0100200 A1* 4/2010 Kim et al. ...................... 700/12
2010/0194197 A1* 8/2010 Lee ........................... H02J 1/08
  307/31
2011/0199047 A1  8/2011 Fujii

FOREIGN PATENT DOCUMENTS

| CN | 201397408 Y | 2/2010 |
| CN | 201608408 U | * 10/2010 |
| CN | 201733116 U | 2/2011 |

(Continued)

OTHER PUBLICATIONS

Extended European Search Report issued in corresponding European Patent Application No. 12194936.6, mailed Mar. 5, 2013.

(Continued)

*Primary Examiner* — Drew A Dunn
*Assistant Examiner* — Zixuan Zhou
(74) *Attorney, Agent, or Firm* — Brinks Gilson & Lione

(57) ABSTRACT

Embodiments of the present invention disclose a charger integrating a network interface conversion apparatus, which is used with a wireless mobile gateway device. The charger includes a first interface, a power interface, a second interface, a charging circuit, and a network interface adapter circuit. The power interface is connected to an input end of charging circuit. An output end of the charging circuit is connected to the first interface and a power supply terminal of the network interface adapter circuit. The second interface is connected to a signal terminal which has a corresponding format and is of the network interface adapter circuit, and the first interface is connected to a signal terminal which has a corresponding format and is of the network interface adapter circuit.

4 Claims, 1 Drawing Sheet

(56) References Cited

FOREIGN PATENT DOCUMENTS

| JP | S6194526 A | | 5/1986 |
| JP | 2005085208 A | * | 3/2005 |
| JP | 2007215136 A | | 8/2007 |
| JP | 2009267447 A | | 11/2009 |
| JP | 2011-167003 A | | 8/2011 |

OTHER PUBLICATIONS

Copy of International Search Report issued in corresponding PCT Patent Application No. PCT/CN2012/085223, mailed Mar. 7, 2013.

* cited by examiner

US 9,444,277 B2

CHARGER INTEGRATING NETWORK INTERFACE CONVERSION APPARATUS

CROSS-REFERENCE TO RELATED APPLICATIONS

This application claims priority to Chinese Patent Application No. 201110394924.0, filed on Dec. 2, 2011, and International Patent Application No. PCT/CN2012/085223, filed on Nov. 24, 2012, both of which are hereby incorporated by reference in their entireties.

FIELD OF THE INVENTION

The present invention relates to the field of communication technologies, and in particular, to a charger integrating a network interface conversion apparatus.

BACKGROUND OF THE INVENTION

With the development of communication technologies, a communication terminal can access a network in more and more manners. However, in view of general classification, the manners may still be classified into two types: cable access and wireless access.

For a cable access technology, a terminal generally adopts an RJ45 interface to access an optical fiber transmission network; while for a wireless access technology, a terminal may access a network through a wireless local area network, or access a network through a wireless wide area network.

Certainly, the wireless access manner and the cable access manner may be exchangeable according to actual needs. For example, a wireless router is a conversion and routing apparatus between an optical fiber access network and a wireless local area network; and a Wi-FI (wireless fidelity) wireless modem router is a conversion and routing apparatus between a wireless local area network and a wireless wide area network.

However, due to technical limitations, there is always a great difference by comparing a bandwidth of the wireless wide area network with that of the optical fiber access network; and the optical fiber access network fails to support a mobility requirement of an access device because a geographical location of an access environment is relatively fixed. An access routing device, which supports accessing the optical fiber access network or the wireless wide area network upward and serves as an access hotspot of the wireless local area network downward at the same time, also exists. However, a size of the device is often too large, so that the device is not suitable to carry.

Another solution is that a user carries a charger and a network interface conversion device at the same time, and uses them with an access route device as required. However, according to this solution, a user needs to carry multiple peripherals, and plug in or remove them frequently in use, which is not convenient.

SUMMARY OF THE INVENTION

Embodiments of the present invention disclose a charger integrating a network interface conversion apparatus, which is used with a wireless mobile gateway device. A user does not need to carry another peripheral, and may conveniently operate the wireless mobile gateway device to switch freely between a wireless wide area network and an optical fiber access network, and use a charging function at the same time.

An embodiment of the present invention discloses a charger integrating a network interface conversion apparatus, including a first interface, a power interface, a second interface, a charging circuit, and a network interface adapter circuit.

The power interface is connected to an input end of the charging circuit, an output end of the charging circuit is connected to the first interface and a power supply terminal of the network interface adapter circuit, the second interface is connected to a signal terminal which has a corresponding format and is of the network interface adapter circuit, and the first interface is connected to a signal terminal which has a corresponding format and is of the network interface adapter circuit.

The first interface is configured to connect to a wireless mobile gateway device used with the charger, the power interface is configured to connect to a power supply, the second interface is configured to connect to an optical fiber access network, the charging circuit is configured to convert alternating current power into direct current power for charging the wireless mobile gateway device, and the network interface adapter circuit is configured to perform conversion between a data format of the optical fiber access network and a data format supported by the first interface.

The charger integrating the network interface conversion apparatus disclosed in the embodiments of the present invention is used with the wireless mobile gateway device, so as to enable the wireless mobile gateway device to access the optical fiber access network through the charger in a scenario where the wireless mobile gateway device is connected to the charger and the optical fiber access network exists; and access the wireless wide area network normally in a scenario where the charger is removed. Moreover, the charger integrating the network interface conversion apparatus may be carried by a user conveniently, thereby avoiding trouble of carrying a charger and a network interface conversion device at the same time.

DETAILED DESCRIPTION OF THE EMBODIMENTS

Figure 1:
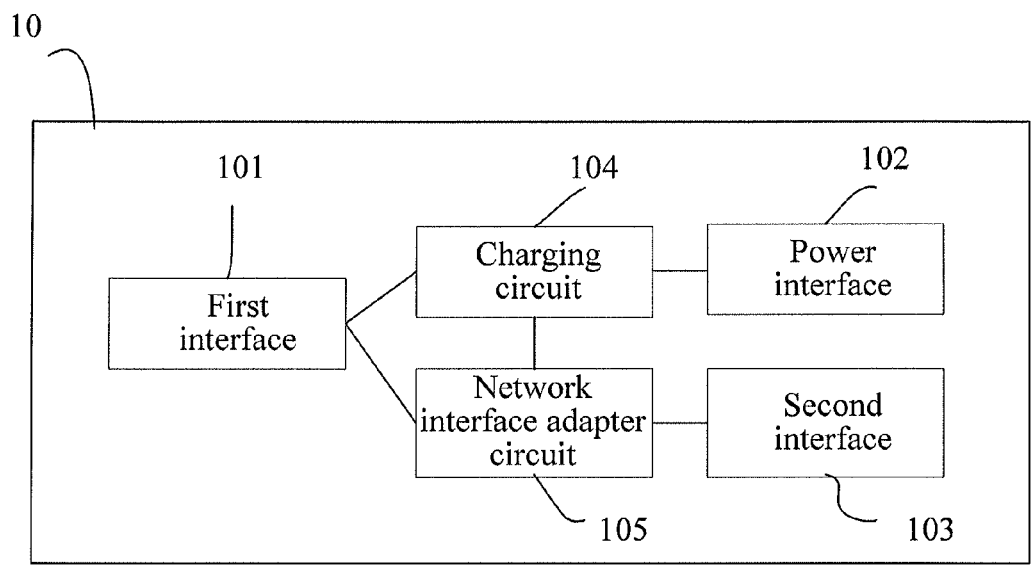
FIG. 1 is a schematic structural diagram of a charger integrating a network interface conversion apparatus according to an embodiment of the present invention.

To make the objectives, technical solutions, and advantages of the present invention more clear, the specific embodiments of the present invention are further described in detail with reference to the accompanying drawings in the following.

A charger integrating a network interface conversion apparatus disclosed in the embodiments of the present invention is a peripheral of a wireless mobile gateway device. The wireless mobile gateway device is a currently popular route access device between a wireless wide area network and a wireless local area network. Taking Huawei's E5 series products as an example, a wireless mobile gateway device can convert a 3G (standards such as WCDMA, TD-SCDMA, and CDMA2000) or 2G (generally referring to GPRS or CDMA 1X) signal in the wireless wide area network into a Wi-Fi wireless local area network signal to serve as an Internet access point for network access of other Wi-Fi devices (such as IPAD, cell phone with a Wi-Fi function, and PSP). Generally, a wireless mobile gateway device needs to have a built-in battery, and at the same time, is equipped with a charger for charging the battery. Furthermore, the wireless mobile gateway device generally also has a standard USB interface (such as Micro USB and Mini USB). The USB interface may be configured to connect to the charger as an interface for charging, and may also connect to an external device through a USB connection line or through a USB connector disposed on the wireless mobile gateway device, so as to perform data communication. For example, the USB interface connects to a personal computer, and connects to an optical fiber access network through the personal computer, so that the wireless mobile gateway device uses a resource of the optical fiber access network instead of a resource of the wireless wide area network, converts a 3G or 2G signal into a Wi-Fi wireless local area network signal, and is used as an Internet access point for the network access of the other Wi-Fi devices.

It may be seen from the foregoing description that, an existing wireless mobile gateway device can not only convert a wireless wide area network signal into a Wi-Fi signal, but also converting an optical fiber access network signal transmitted through the USB interface into a Wi-Fi signal, and the USB interface also has a capability of a charger interface. However, the wireless mobile gateway device can only use this function by connecting to an external device that can access the optical fiber access network and has a USB interface, such as the personal computer. This using manner greatly limits freedom of use by a user. For example, a user who has a tablet PC IPAD of APPLE Inc. can access the wireless mobile gateway device through Wi-Fi, but a hotel where the user checks in only provides the optical fiber access network for free. In this case, the user still needs to rely on the wireless wide area network to access a network when using the wireless mobile gateway device in the foregoing description. Therefore, a bandwidth is limited, and high expense on traffic is generated.

In addition, there is also a network interface adapter, which can convert an optical fiber access network signal into a USB interface signal. However, because the wireless mobile gateway device needs to consume power at work when it works as a Wi-Fi access hotspot, and the foregoing network interface adapter also needs to consume power at work, the battery of the wireless mobile gateway device only can support power supply in a short time. Because generally only one USB interface is disposed on the wireless mobile gateway device, only one can be chosen between a charging function and a data transmission function at a certain moment. This using manner causes that network access of a user cannot last long and the foregoing network interface adapter and the charger need to be plugged in and removed alternately.

An embodiment of the present invention discloses a charger integrating a network interface conversion apparatus, as shown in FIG. 1.

FIG. 1 shows a charger integrating a network interface conversion apparatus 10, including a first interface 101, a power interface 102, a second interface 103, a charging circuit 104, and a network interface adapter circuit 105. The first interface 101 is configured to connect to a wireless mobile gateway device, may work as a charging interface, and may also transmit data. Typically, the first interface 101 may be a USB interface, and certainly may be another interface that can not only provide a charging function and but also perform data transmission. The power interface 102 is configured to connect to a power supply, where the power interface 102 may be a plug. The second interface 103 may be an optical fiber access network interface, and typically may be an RJ45 interface. The charging circuit 104 is an alternating-current-to-direct-current conversion circuit and a step-down circuit, and, for example, can convert 220V civil alternating current power into 5V direct current power. The circuit is found is common chargers. The network interface adapter circuit 105 is configured to implement interconversion between a signal of the second interface and a signal of the first interface, which may be achieved by adopting a specific chip and a necessary peripheral circuit. For example, if the first interface 101 is a USB interface and the second interface 103 is an RJ45 interface, the network interface adapter circuit 105 may be a LAN9500 solution of the SMSC company. As shown in FIG. 1, connection relationships of the foregoing parts may be as follows: the power interface 102 is connected to an input end of the charging circuit 104, an output end of the charging circuit 104 is connected to the first interface 101 and a power supply terminal of the network interface adapter circuit 105, the second interface 103 is connected to a signal terminal which has a corresponding format and is of the network interface adapter circuit 105, and the first interface 101 is connected to a signal terminal which has a corresponding format and is of the network interface adapter circuit 105. It may be understood that, the network interface adapter circuit 105 inevitably has signal terminals of at least two formats, so that conversion between signals of two formats can be implemented, such as interconversion between an optical fiber access network signal and a USB interface signal. The foregoing corresponding formats refer to formats that correspond to connected interfaces. For example, when the second interface 103 is the RJ45 interface, it should be connected to an optical fiber access network signal terminal in the network interface adapter circuit 105; and when the first interface 101 is the USB interface, it should be connected to a USB signal terminal of the network interface adapter circuit 105.

When the charger shown in FIG. 1 is applied, the first interface 101 is connected to the wireless mobile gateway device, and the power interface 102 is connected to a socket of the civil alternating current power. In this case, the charging circuit 104 can convert the alternating current power into the direct current power, charges the wireless mobile gateway device through the first interface 101, and supplies power to the network interface adapter circuit 105 at the same time. If a user needs to use an optical fiber access network at the same time, a network connector may be plugged in the second interface 103, and the network interface adapter circuit 105 can convert the optical fiber access network signal into a signal having a format supported by the first interface 101, and transmit the converted signal to the wireless mobile gateway device; similarly, the network interface adapter circuit 105 converts a signal from the first interface 101 into a signal having a format of the optical fiber access network, and outputs the converted signal through the second interface 103. If the power interface 102 of the charger 10 is not connected to an alternating current power supply, and the second interface 103 is connected to a connector of the optical fiber access network, the wireless mobile gateway device may supply power to the network interface adapter circuit 105 through the first interface 101, so as to support work of the network interface adapter circuit 105, which implements conversion between the optical fiber access network signal and the format supported by the first interface. If the first interface 101 is the USB interface, data exchange between the wireless mobile gateway device and the network interface adapter circuit 105 of the charger 10 may be implemented by adopting an OTG (On-The-Go, a technology for implementing data transmission between two USB devices in a scenario where there is no host) function of a USB system.

It may known from the foregoing that, by using the charger integrating the network interface conversion apparatus disclosed in the embodiment of the present invention, the charging function or a network interface conversion function may be used alone, and these two functions may also be used at the same time, so as to provide convenient choices for the user.

Further, the charger 10 shown in FIG. 1 may also be improved, so as to add a function of switching between the charging function and the network interface conversion function. For example, a manual switch (not shown) may be disposed on the charger 10 shown in FIG. 1. The switch may be disposed between the power interface 102 and the charging circuit 104, disables the charging function of the charger 10 in a manner of cutting off the power, or enables the charging function and the network interface conversion function at the same time by connecting to the power. In this way, the charging circuit is no longer kept connected in a case that a battery of the wireless mobile gateway device is fully charged, which is advantageous to protection of the battery.

Furthermore, the foregoing switch may be a single-pole double-throw switch disposed at the output end of the charging circuit 104, connects the output end of the charging circuit 104 to the power supply terminal of the network interface adapter circuit 105 or to the first interface 101 alternatively. When the first interface 101 is a Mini USB interface, if the output end of the charging circuit 104 is connected to the Mini USB interface, an ID pin of the Mini USB interface is made to be at a high level, or otherwise at a low level. The wireless mobile gateway device may determine a working status of the charger 10 by detecting a level of the ID pin. Or the switch is a single-pole triple-throw switch disposed at the output end of the charging circuit 104, and can control the output end of the charging circuit 104 to be connected to one or both of the power supply terminal of the network interface adapter circuit 105 and the first interface 101.

Figure 2:
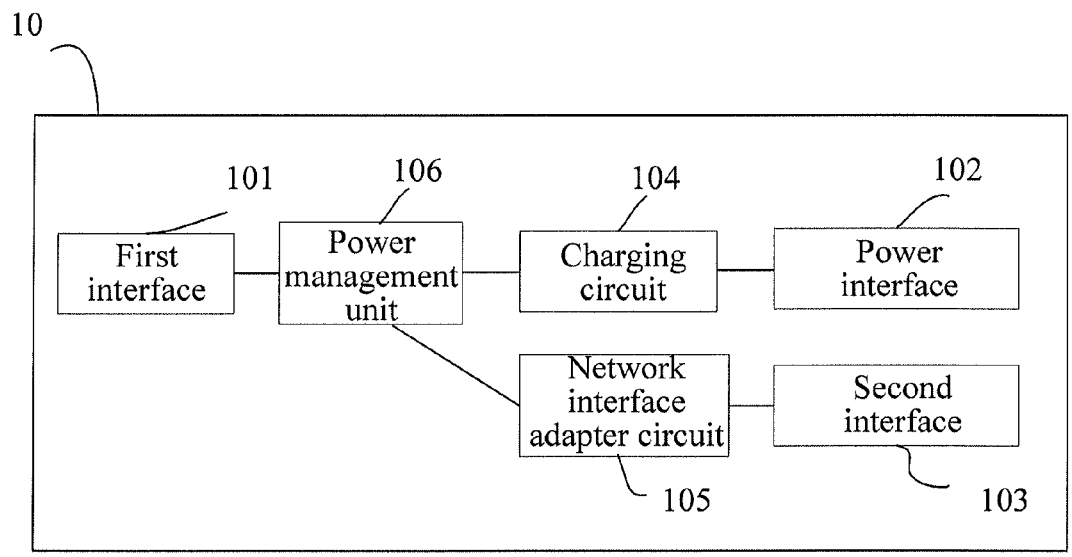
FIG. 2 is another schematic structural diagram of a charger integrating a network interface conversion apparatus according to an embodiment of the present invention.

By adopting a manner of a dedicated switch, the user needs to perform manual operation. To further reduce complexity for the user, as shown in FIG. 2, a power management unit PMU may be added on the basis of the charger 10 shown in FIG. 1. The power management unit 106 is connected to the output end of the charging circuit 104, the power supply terminal of the network interface adapter circuit 105, and the first interface 101. Functions of the power management unit 106 are similar to those of the foregoing single-pole double-throw switch or the foregoing single-pole triple-throw switch, while a difference lies in that, the power management unit 106 may further receive a detection result about whether a signal is connected to the second interface 103. If the detection result indicates that a signal is connected to the second interface 103, it indicates that the charger 10 enables the network interface conversion function. In this case, the power management unit may connect the output end of the charging circuit 104 to the first interface 101 and the power supply terminal of the network interface adapter circuit 105 at the same time, or cut connection of the output end of the charging circuit 104 to the first interface 101 and the power supply terminal of the network interface adapter circuit 105 at the same time, or only connect the output end of the charging circuit 104 to the power supply terminal of the network interface adapter circuit 105. If the detection result indicates that no signal is connected to the second interface 103, it indicates that the charger 10 does not enable the network interface conversion function. In this case, the power management unit may connect the output end of the charging circuit 104 to the first interface 101, and cut connection of the output end of the charging circuit 104 to the power supply terminal of the network interface adapter circuit 105.

When the first interface 101 is a Mini USB interface, if the output end of the charging circuit 104 is connected to the Mini USB interface, an ID pin of the Mini USB interface is made to be at a high level, or otherwise at a low level.

The detection result about whether a signal is connected to the second interface 103 may be from a dedicated second interface detecting apparatus (not shown), which is configured to detect whether a corresponding interface is plugged in the second interface 103, or from a controller in the network interface adapter circuit, where the controller may detect whether the second interface has corresponding signal input.

By applying the charger integrating the network interface conversion apparatus disclosed in the embodiment of the present invention with the wireless mobile gateway device, a charging function or the network interface conversion function may be used alone, and these two functions may also be used at the same time, so as to provide convenient choices for the user. Moreover, the charger exists as a peripheral, which is convenient to carry.

The preceding embodiments are only intended to describe the technical solutions of the present invention, but are not intended to limit the present invention. Although the present invention is described in detail with reference to the foregoing embodiments, those of ordinary skill in the art should understand that they may still make modifications to the technical solutions recorded in the foregoing embodiments, or equivalent replacements to part of the technical features; however, these modifications or replacements do not make the essence of corresponding technical solutions depart from the scope of the technical solutions in the embodiments of the present invention.

What is claimed is:

1. A charger, comprising:
   a first interface;
   a power interface;
   a second interface;
   a charging circuit;
   a network interface adapter circuit; and
   a power management unit;
   a switch;
   wherein:
   the power interface is connected to an input end of the charging circuit, the power management unit is connected to an output end of the charging circuit, the network interface adapter circuit, and
   the power interface is connected to the input end of the charging circuit through the switch;
   the first interface, the second interface is connected to the network interface adapter circuit; and the first interface is configured to connect to a wireless mobile gateway device, the power interface is configured to connect to a power supply, the second interface is configured to connect to an access network, the charging circuit is configured to convert alternating current power into direct current power for charging the wireless mobile gateway device; and the network interface adapter circuit is configured to perform conversion between a data format of the access network and a data format supported by the first interface;

receive information about whether the second interface has signal input; when the second interface has signal input; enable connection between the output end of the charging circuit and the first interface and connection between the output end of the charging circuit and the network interface adapter circuit; and when the second interface has no signal input; enable the connection between the output end of the charging circuit and the first interface and disable the connection between the output end of the charging circuit and the network interface adapter circuit.

2. The charger according to claim 1, wherein the first interface is a USB interface and the second interface is an RJ45 interface.

3. The charger according to claim 1, wherein the first interface is a Mini USB interface; if the output end of the charging circuit is electrically connected to the Mini USB interface, an ID pin of the Mini USB interface is made to be at a high level, or otherwise at a low level.

4. A charge system; comprising:
a wireless mobile gateway device; and
a charger; the charger comprising:
a first interface;
a power interface; a second interface;
a charging circuit; and
a network interface adapter circuit;
a switch;

wherein:
an input end of the charging circuit is connected to the power interface, an output end of the charging circuit is connected to the first interface and the network interface adapter circuit, the network interface adapter circuit is connected to the first interface and the second interface;

the output end of the charging circuit is connected to the first interface and an output end of the network interface adapter circuit through the switch;

the switch connects the output end of the charging circuit to the output end of the network interface adapter circuit or to the first interface alternatively;

the first interface is configured to connect to the wireless mobile gateway device, the power interface is configured to connect to a power supply, the second interface is configured to connect to an access network, the charging circuit is configured to convert alternating current power into direct current power for charging the wireless mobile gateway device, and the network interface adapter circuit is configured to perform conversion between a data format of the access network and a data format supported by the first interface; and the wireless mobile gateway device, further comprising a battery, is configured to supply power to the network interface adapter circuit through the first interface when the power interface is not connected to the power supply and the second interface has signal input.

* * * * *